United States Patent [19]
Danielson

[11] 3,934,657
[45] Jan. 27, 1976

[54] DUAL SAFETY CONTROL MEANS FOR A POWER TOOL
[75] Inventor: Irvin R. Danielson, Burr Ridge, Ill.
[73] Assignee: Thor Power Tool Company, Aurora, Ill.
[22] Filed: Aug. 1, 1974
[21] Appl. No.: 493,922

[52] U.S. Cl. ............... 173/169; 51/170 T; 415/503
[51] Int. Cl.² ......................................... B23B 45/04
[58] Field of Search ...... 173/169, 163; 91/424, 425, 91/DIG. 2, 464; 415/1, 503; 51/170 R, 170 PT, 170 T, 170 EB, 170 TL, 170 MT

[56] References Cited
UNITED STATES PATENTS

| 762,126 | 6/1904 | Bond | 173/169 X |
|---|---|---|---|
| 2,326,396 | 8/1943 | Schaedler | 51/170 T |
| 2,382,591 | 8/1945 | Warren | 173/163 |
| 2,598,907 | 6/1952 | Griffin | 91/424 |
| 3,775,851 | 12/1973 | Flatland | 415/503 X |
| 3,775,911 | 12/1973 | Flagge | 51/170 T |

Primary Examiner—Frank L. Abbott
Assistant Examiner—Richard E. Favreau

[57] ABSTRACT

A safety control means for a portable power tool, such as a pneumatically driven hand grinder, wherein fluid supply and discharge passages are provided in the support handles of the tool and are respectively connected to the fluid inlet and outlet of the motor. First and second fluid control members are mounted in the handles on the upstream and downstream sides, respectively, of the fluid inlet and outlet of the motor. The first control member is movable to a first position preventing motive fluid from flowing through the supply passage and a second position permitting motive fluid to flow through the supply passage. The second control member is likewise movable to a first position preventing motive fluid from flowing through the discharge passage and a second position permitting flow through the discharge passage. A control lever is pivotally mounted on each of the tool support handles for effecting movement of the respective control members between their first and second positions. Start up and continuous operation of the tool is obtained only so long as both levers are grasped by the operator of the tool and retained in positions holding the control members in their second position.

12 Claims, 9 Drawing Figures

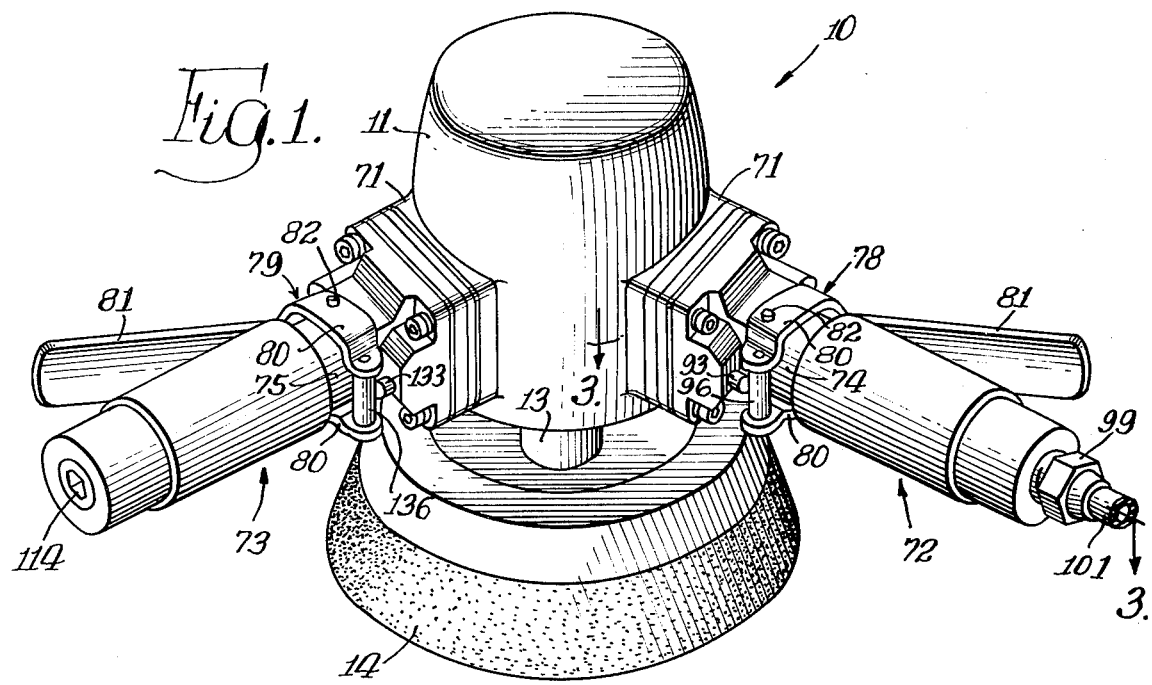
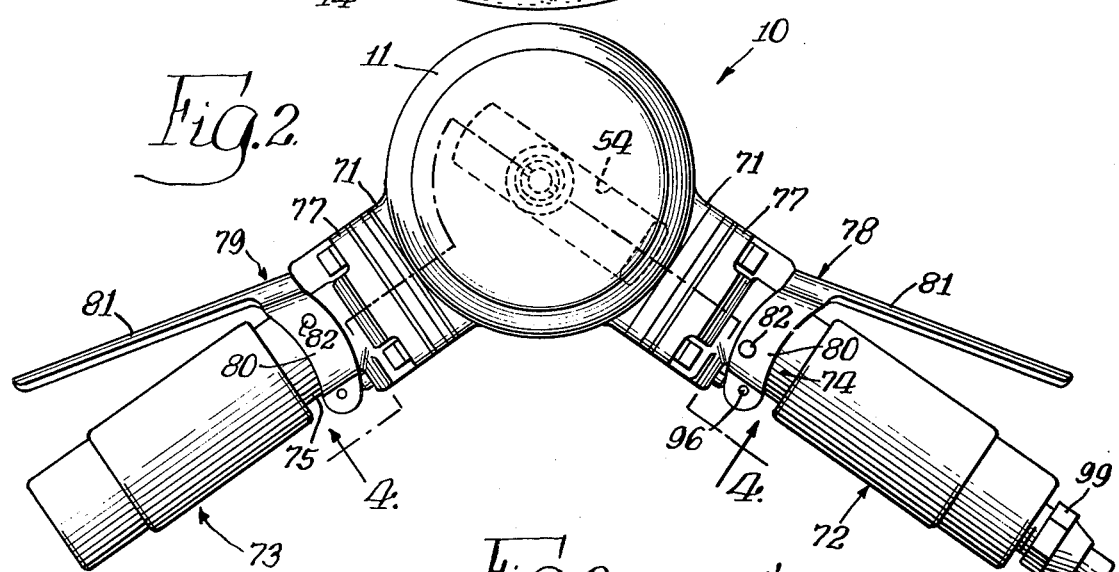
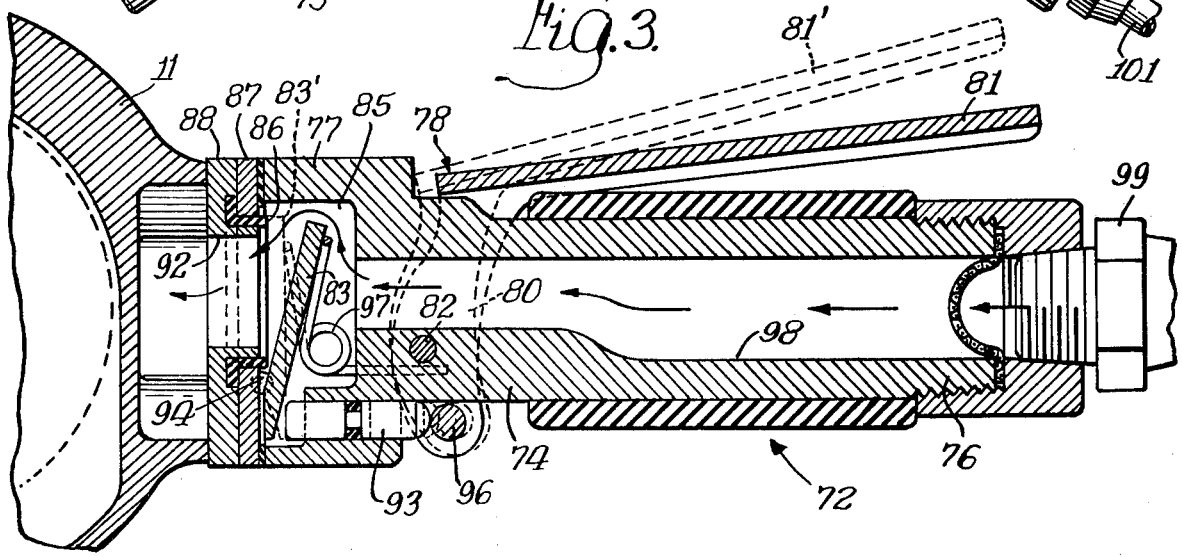

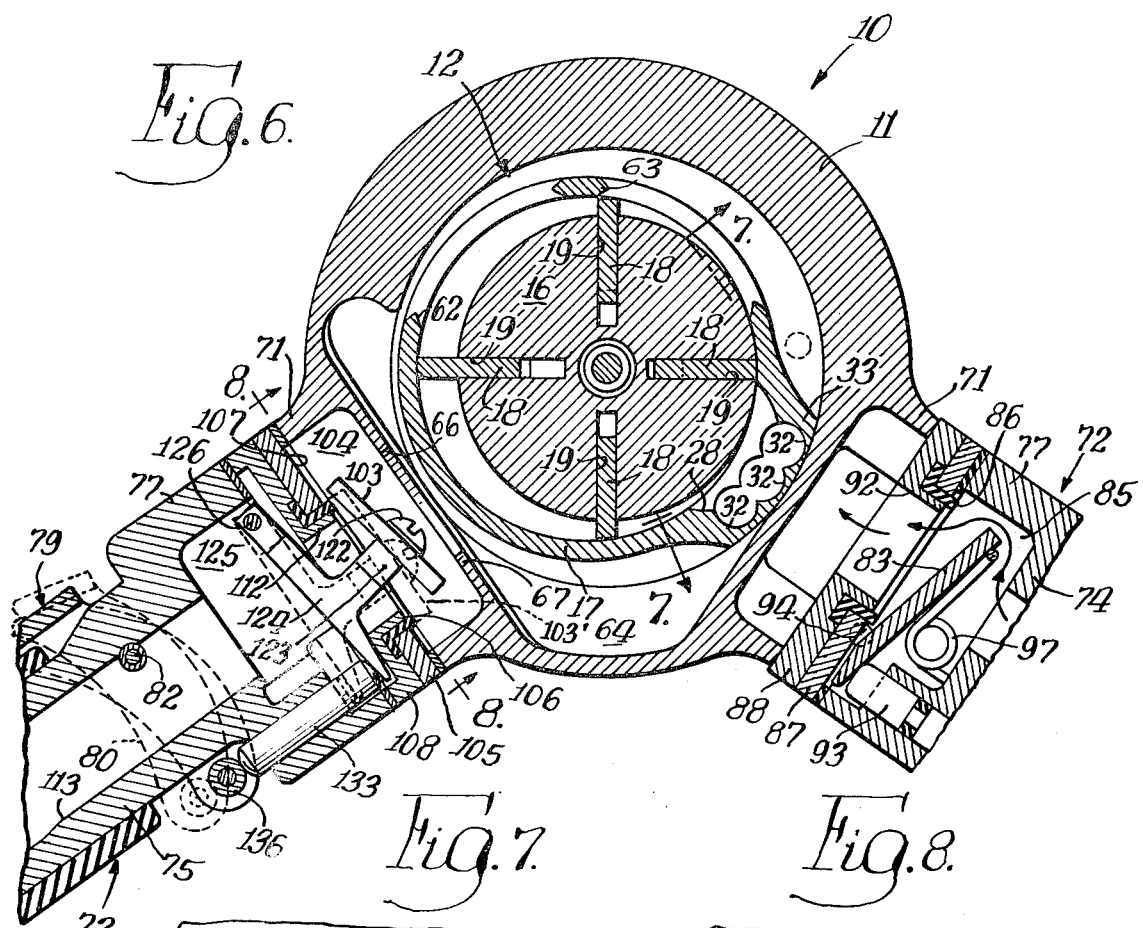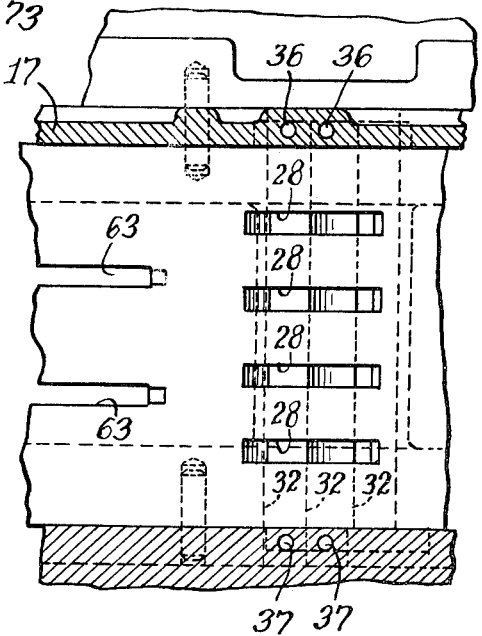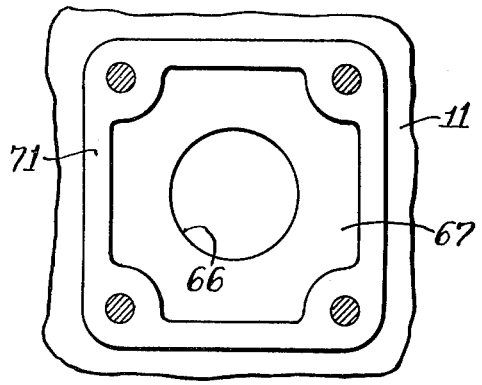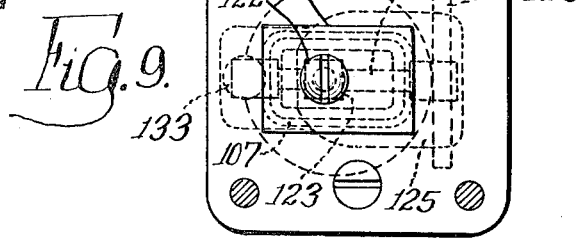

DUAL SAFETY CONTROL MEANS FOR A POWER TOOL

This invention relates to safety controls for power tools, and more particularly relates to a dual safety control means for a pneumatically driven portable grinder.

Various types of safety control devices have been heretofore advanced for protecting the operators of power tools when the latter are in operation or to prevent unintentional starting of the tool. In the case of portable power tools, various types of "dead man" type controls have been developed to effect shutdown of the tool whenever the operator removes one or the other or both of his hands from the control or throttle levers of the tool. An example of a dual safety control of the foregoing character is disclosed and claimed in the Andrew Flagge U.S. Pat. No. 3,775,911, issued Dec. 4, 1973 and assigned to the assignee of this application.

While many of the safety control devices heretofore advanced for use with portable power tools have proved generally satisfactory for their intended purpose, others have not for various reasons, such as a capability of causing startup of the tool if the latter was accidentally tipped over or dropped while connected to its power and excessively long coast down times after the control lever of the safety device was released by the operator.

Accordingly, it is a general object of the present invention to provide a novel safety control means for a power tool.

A more particular object is to provide a novel dual safety control means for a portable or hand-held power tool.

Another object is to provide a novel dual safety control means of the foregoing character, which requires the user to manually and concurrently actuate two separate control elements in order to initiate and maintain operation of the tool.

A more particular object is to provide a novel safety control means for a hand-held, pneumatically driven grinder, which prevents operation of the tool until two separate, manually actuated throttle levers are shifted to their open positions by the user.

A specific object is to provide a novel safety control means for a power tool of the character described, which effects rapid shutdown of the tool and cessation of rotation of the output shaft thereof whenever the user releases one or the other or both of the throttle levers of the tool.

Other objects and advantages of the invention become apparent from the following detailed description and accompanying sheets of drawings, in which:

FIG. 1 is a perspective view of a portable grinder incorporating a dual safety control means embodying the features of the present invention;

FIG. 2 is a top plan view of the grinder shown in FIG. 1;

FIG. 3 is an enlarged, sectional view taken substantially along the line 3—3 of FIG. 1;

Figure 4:
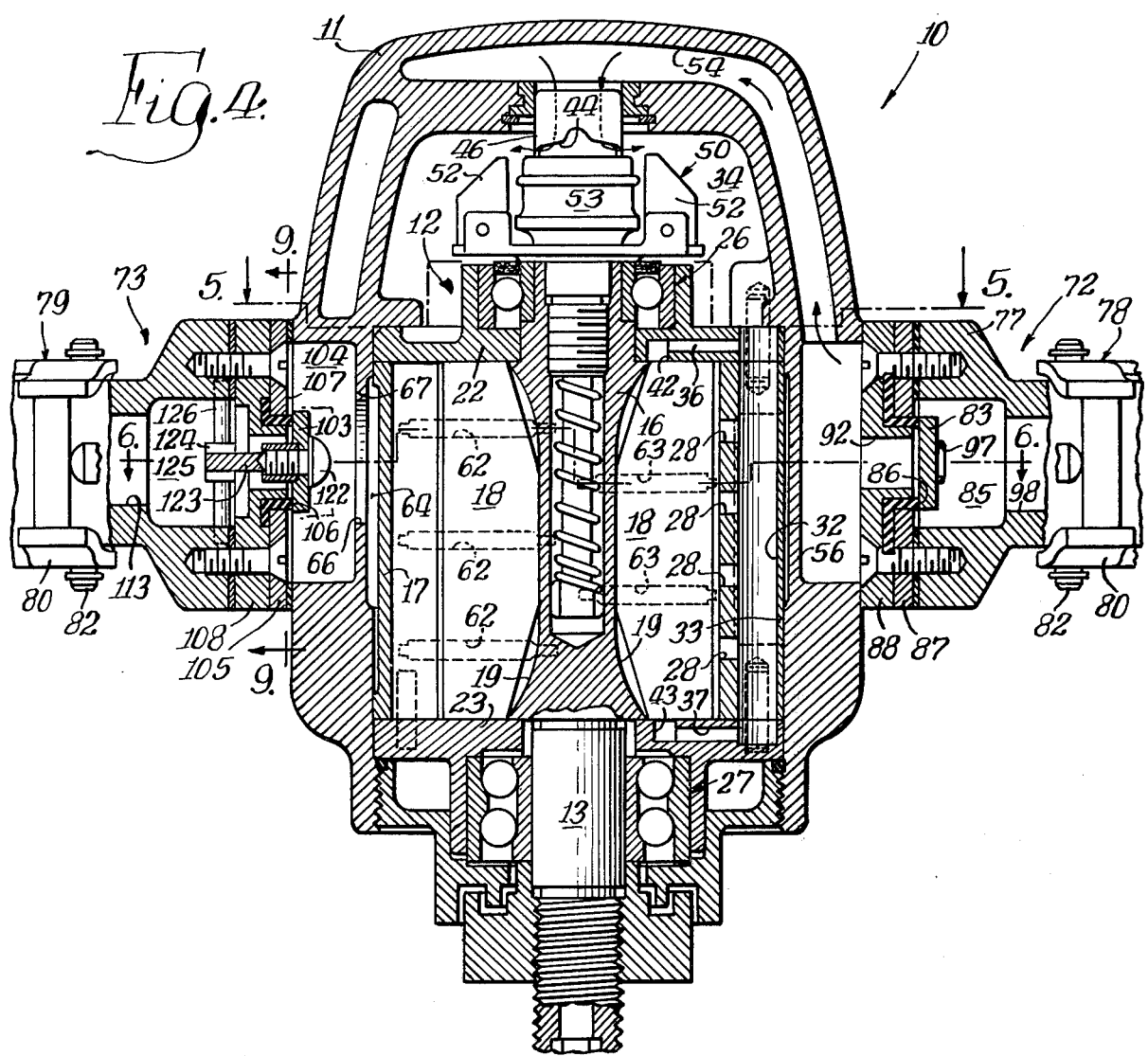
FIG. 4 is a vertical sectional view taken along the line 4—4 of FIG. 2.
Figure 5:
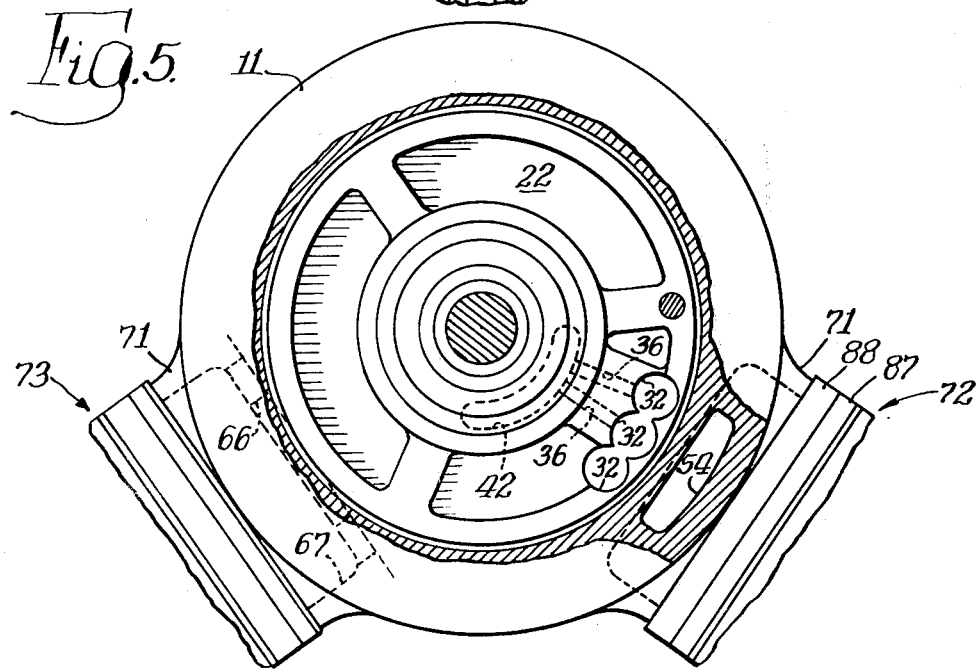

FIGS. 5 and 6 are staggered, transverse sectional views taken along the lines 5—5 and 6—6, respectively, of FIG. 4;

FIG. 7 is a fragmentary sectional view taken along the line 7—7 of FIG. 6; and

FIG. 8 and 9 are sectional views taken along the lines 8—8 and 9—9 of FIGS. 6 and 4, respectively.

In FIGS. 1 and 2, a power tool embodying the features of the present invention, in this instance a portable hand grinder, is illustrated and indicated generally at 10. The grinder 10 includes a housing 11 which is circular in cross section and which encloses a fluid motor indicated generally at 12 in FIGS. 4 and 6. The motor 12 in the present instance is of the pneumatic type and includes a power output member in the form of a shaft 13 which projects axially from the lower end of the housing 11 as viewed in FIGS. 1 and 4 and which is adapted to receive a work performing member, such as a grinding wheel 14 (FIG. 1). Thus, when motive fluid under pressure, such as compressed air, is supplied to the motor 12, the shaft 13, as well as the grinding wheel 14, are driven at a suitable rate of speed.

Referring now to FIGS. 4, 5 and 6, in conjunction with FIGS. 1 and 2, it will be seen that the motor 12 comprises a rotor 16 mounted in a cylinder bushing 17 and having a plurality of plate-like vanes 18 mounted in a plurality of circumferentially spaced, axially extending slots 19 (FIG. 6) in the rotor 16. The radially outer edges of the vanes 18 engage the inner surface of the bushing and reciprocate in their slots 19 as the rotor 16 rotates due to the eccentricity of the axis of rotation of the rotor 16 with respect to the axis of the cylinder bushing 17. A pair of upper and lower end plates, indicated at 22 and 23, respectively, in FIG. 4, engage the end faces of the rotor 16 and cylinder bushing 17 and provide mountings for upper and lower bearing assemblies, indicated at 26 and 27, for the rotor 16.

When the motor 12 is in operation, compressed air is supplied to pumping chambers defined between the respective pairs of vanes 18 and the opposite inner and outer surfaces of the cylinder bushing 17 and rotor 16, respectively, through a fluid inlet provided by a plurality of axially spaced arcuately extending ports 28 (FIGS. 4, 6 and 7) in the side wall of the cylinder bushing. The ports 28 communicate with a plurality of intersecting axial bores 32 (FIGS. 4–7, inclusive) in a radially thickened portion 33 (FIGS. 4 and 6) of the cylinder bushing 17, the upper ends of the bores 32 communicating with a chamber 34 (FIG. 4) in the housing 11 on the upper or outer side of the upper end plate 22. A plurality of radial bores 36 and 37 in the upper and lower end plates 22 and 23 have their radially outer ends connected with the bores 32 and at their radially inner ends with arcuate slots 42 and 43 in the axially inner end faces of the plates, the slots 42 and 43 serving to supply air under pressure to the bottoms of the slots 19 for urging the vanes 18 outwardly against the inner surface of the cylinder bushing 17.

Air under pressure is supplied to the chamber 34 through a port 44 (FIG. 4) in the tubular upper end, indicated at 46, of the shaft of a governor assembly, indicated generally at 50, carried at the upper end of the rotor 16. The governor assembly 50 includes a plurality of governor weights 52, which serve to effect axial movement of a sleeve 53 on the upper end 46 of the governor assembly and hence reduce or increase the effective size of the port 44 with changes in the speed of rotation of the rotor 16. Air under pressure is supplied to the interior of the tubular upper end 46 of the governor assembly 50 from a cored passage 54 in the housing 11, the upstream end of which communicates with a recess 56 in the outer side of the side wall of the housing 11.

Air is discharged from the pumping chambers of the motor 12 through a plurality of primary and secondary exhaust ports, respectively indicated at 62 and 63 in FIGS. 4 and 6 in the cylinder block 17. The primary and secondary exhaust ports 62 and 63, which comprise the fluid outlet of the motor 12, communicate with a chamber 64 in the housing 11 and surrounding the cylinder block 17 and thence with a port 66 in a recessed portion 67 of the side wall of the housing 11.

In order to permit an operator of the tool to manipulate the same over a work area, handle means in the form of a pair of elongated, right and left handle assemblies, respectively indicated at 72 and 73 in FIGS. 1, 2 and 6, are secured to the housing 11 of the tool 10. In the present instance, the handle assemblies 72 and 73 are secured to bosses 71 on the exterior of the housing 11, the bosses being positioned so that the handle assemblies 72 and 73 lie in a plane generally perpendicular to the axis of the motor shaft 13 and so that the angle between the axes of the handle assemblies is about 110°.

The handle assemblies 72 and 73 include elongated, tubular bodies 74 and 75, respectively, each of said bodies having a cylindrical outer end 76 (FIG. 3) and a generally rectangular inner or housing engaging end 77. The handle assemblies 72 and 73 respectively include manually actuated means in the form of a pair of pivotally mounted levers 78 and 79 each having a mounting portion in the form of a pair of bifurcated arms 80 and a handle portion 81 connected to said mounting portions and normally extending in angularly diverging relation with respect to the handle bodies 74 and 75 when the levers are mounted thereon. Cross pins 82 extend through the arms 80 and bodies 74 and 75 and pivotally secure the levers 78 and 79 to the bodies. The handle portions 81 of the levers 78 and 79 are positioned so as to be moved toward their respective bodies 74 and 75 when a user grasps the handle assemblies to lift the tool or to place the same in operation. The manner in which the levers 78 and 79 control the operation of the tool 10 will be described more fully hereinafter.

Referring now more particularly to FIG. 3 it will be seen that the handle assembly 72 includes a control member in the form of a valve plate 83 mounted in a cavity 85 in the rectangular inner end 77 of the body 74. The valve plate 83 is movable toward and away from a seat 86 carried between a pair of plates 87 and 88 secured to the end face of the inner end 77 of the handle body 74. The plate 88 has a central opening 92 therethrough defining a port at the inner end of the handle assembly 72 through which air under pressure may flow when the valve plate 83 is spaced from its seat 86, as shown in full lines in FIGS. 3 and 6.

Pivotal movement of the valve plate 83 from its closed position illustrated in full lines in FIG. 4 and in broken lines and indicated at 83' in FIG. 3, to its open position illustrated in full lines in FIGS. 3 and 6 is effected by a plunger 93, which contacts the plate 83 below its fulcrum point, the latter being provided by a pair of balls 94 positioned in opposed recesses in the plate 87 and valve plate 83. The opposite or outer end of the plunger 93 is engaged by a cross pin 96 extending between the ends of the arms 80 of the lever 78. One end of a spring 97 engages the valve plate 83 and causes the latter to pivot to its aforementioned closed position whenever the operator of the tool releases his grip on the handle portion 81 of the lever 78.

As heretofore mentioned, the interior of the body 74 of the handle assembly 72 is hollow. Such hollow interior defines a supply passage, indicated at 98 in FIG. 3, in the handle body 74 through which motive fluid under pressure may flow. Such motive fluid enters the supply passage 98 through a fitting 99 threaded into the outer end of the body 74, the fitting 99 being connected to a suitable source of fluid under pressure, such as compressed air, by a fluid conduit, such as a hose. A portion of the hose is shown in FIGS. 1 and 2 and indicated at 101.

Referring now to FIGS. 6, 8 and 9 in conjunction with FIGS. 1 and 2, it will be seen that the handle assembly 73 likewise includes a control member in the form of a valve plate 103, which is positioned in a cavity 104 defined by the recessed side wall portion 67 of the housing 11 and the adjacent side face of a plate 105 secured to the inner end 77 of the handle body 75. The valve plate 103 is movable toward and away from a valve seat 106, which projects somewhat inwardly of the side face, indicated at 107, of the plate 105. Another plate 108 is disposed between the plate 105 and the inner end 77 of the handle 75 and defines a port 112 at the inner end of the handle assembly 73 through which air from the exhaust chamber 64 of the motor 12 may discharge after passing through the port 66 and cavity 104.

The port 112 communicates with the inner end of a fluid discharge passage 113 in the handle body 75, such passage being provided by the hollow interior of the body. Thus, when valve plate 103 is spaced from its seat 106, as shown in full lines in FIG. 6, a substantially unrestricted flow path is provided from the outlet port 66 in the side wall portion 67 of the housing 11 to the atmosphere through the outer end, indicated at 114 in FIG. 1, of the discharge passage 113.

The valve plate 103 is secured, as by a screw 122, to the outer end of an extension 123 of a pivot arm 124, the extension 123 being located intermediate the length of the pivot arm 124 and extending generally axially inwardly or upstream toward the port 112. The pivot arm 124 extends generally transversely of the handle body 75 and is pivotally mounted in a cavity 125 in the rectangular inner end 77 of the handle body 75 by a pin 126 (FIGS. 6 and 9) extending through one end of the arm 124.

Pivotal movement of the valve plate 103 from its first or closed position illustrated in broken lines and indicated at 103' in FIG. 6 to its second or open position illustrated in full lines in this figure, is effected by a plunger 133 which contacts the free end of the pivot arm 124 and causes the valve plate 103 to be shifted away from its seat 106. Pivotal movement of the lever 79 is transmitted to the opposite or outer end of the plunger 133 by a cross pin 136 extending between the ends of the arms 80 of the lever 79. The valve plate 103 will shift to its closed, broken line position 103' by the pressure of the air in the chamber 104 whenever the operator releases his grip on the handle portion 81 of the lever 79. The valve plates 83 and 103 of the handle assemblies 72 and 73 thus comprise control members for preventing motive fluid, in the present instance compressed air, from flowing into the fluid inlet or ports 28 and out of the fluid outlet or slots 62 and 63 of the motor 12 so as to rapidly stop the motor 12 and output shaft 13 thereof whenever one or the other or both of the valve plates moves to their closed position.

The tool 10 and the safety control means thereof, operates as follows:

Assuming that a work performing member, such as the grinding wheel 14, has been secured to the output shaft 13 of the tool 10 and that the distal end of the hose 101 has been connected to a suitable source of motive fluid under pressure, such as compressed air, the tool 10 and the safety control means thereof are capable of performing their intended functions. Thus, if an operator should pick up the tool 10 by one of the handle assemblies 72 or 73 and in so doing pivot the handle portion 81 of the lever associated with that handle assembly to a position such as to open the valve thereof, the tool will not begin to operate since the valve associated with the lever of the other handle assembly will be closed at that time. Consequently, injury to the user or bystanders due to unintentional starting up of the tool at this time is prevented.

The foregoing characteristic of the safety control means of the tool 10 also prevents the tool from operating if the tool is inadvertently tipped over while resting on the floor or other supporting surface, or if the tool is otherwise moved to a position such that the handle portion 81 of one or the other of the levers 78 and 79 is moved toward its associated handle body a sufficient amount to open the associated control valve.

The safety control means of the tool 10 is also effective when the tool is in operation to rapidly stop rotation of the motor 12 and hence the output shaft 13 thereof whenever the operator releases his grip on one or the other or both of the handle portions 81 of the levers 78 and 79.

Thus, if the operator of the tool should release his grip on the handle portion 81 of the lever 78 when the tool is operating, the spring 93 as well as the force of the compressed air in the chamber 85 will cause the valve plate 83 to shift from its open position illustrated in full lines in FIGS. 3 and 6 to its closed position illustrated in full lines in FIG. 4. Consequently, air under pressure in the supply passage 98 of the valve body 74 will be prevented from flowing into the passage 54 in the housing 11 and also through the inlet ports 28 into the motor 12. Rotation of the motor 12 and grinding wheel 14 will thus rapidly terminate.

Alternatively, if the operator should release his grip on the handle portion 81 of the lever 79 when the tool is operating, the pressure of the air in the cavity 104 will cause the valve plate 103 to shift from its open position shown in full lines in FIG. 6 to its closed position illustrated in full lines in FIG. 4. Consequently, exhaust air exhausting from the outlet ports 62 and 63 of the motor 12 will be prevented from flowing from the exhaust chamber 64 of the housing 11 through outlet port 66 and discharge passage 113 in the handle body 75 to the atmosphere. Rotation of the motor 12 and grinding wheel 14 will thus rapidly terminate. Cessation of rotation of the motor 12 and grinding wheel 14 takes place in a matter of milliseconds after the valve plate 103 moves to its closed position since the closed valve plate 103 causes the motor 12 to operate as a compressor and thus dynamically brake rotor 16.

If the operator should simultaneously release his grip on the handle portion 81 of both of the levers 78 and 79 while the tool is operating, the motor 12 and grinding wheel 14 will cease to rotate substantially instantaneously.

While the safety control means herein disclosed has been described in connection with a portable hand grinder utilizing a pneumatic motor, it should be understood that the control means could also be employed in other types of tools of both a portable and fixed character. It should further be understood that the safety control means herein disclosed could be used with tools which employ motors other than those of the rotary type and which utilize motive fluids other than compressed air.

While only one embodiment of the invention has been herein illustrated and described, it will be understood that modifications and variations thereof may be effected without departing from the concepts of the invention as exemplified in the appended claims.

I claim:

1. In a power tool including a housing having a fluid motor therein, said motor having a fluid inlet, a fluid outlet and a power output member adapted to supply power to a work performing member, the improvement of safety control means for controlling the flow of motive fluid supplied to and discharged from said motor and consequently the operation of said tool, said safety control means comprising first and second control members respectively associated with the inlet and outlet of said motor, and manually actuated means operable to effect movement of said control members from a first position preventing motive fluid from flowing into the fluid inlet of said motor and out of the fluid outlet of said motor to a second position permitting motive fluid to flow into said motor inlet and out of said motor outlet so that said motor drives said power output member, said manually activated means including a lever member for each of control member, each of said lever members being movable in the same direction toward said first and second positions, whereby said safety control means is operable to permit operation of said motor when both of said control members are in said second position and render said motor inoperative to drive said power output member or to rapidly stop the same whenever one or the other or both of said control members is in or moves to said first position.

2. The safety control means of claim 1, further characterized in that one of said manually actuated lever members is connected to said first control member and the other of said manually actuated lever members being connected to said second control member.

3. The safety control means of claim 2, further characterized in that a pair of spaced handles are carried by said housing and adapted to be grasped by the respective hands of a user of said tool, and said manually actuated lever members are respectively carried by said handle members.

4. In a power tool including a housing having a fluid motor therein, said motor having a fluid inlet, a fluid outlet and a power output member adapted to supply power to a work performing member, the improvement of safety control means for controlling the flow of motive fluid supplied to and discharged from said motor and consequently the operation of said tool, said safety control means comprising first and second control members respectively associated with the inlet and outlet of said motor, and manually actuated means operable to effect movement of said control members from a first position preventing motive fluid from flowing into the fluid inlet of said motor and out of the fluid outlet of said motor to a second position permitting motive fluid to flow into said motor inlet and out of said motor outlet so that said motor drives said power output member, whereby said safety control means is operable to permit operation of said motor when both of said control members are in said second position and render said motor inoperative to drive said power output member or to rapidly stop the same whenever one or the other or both of said control members is in or moves to said first position, said manually actuated means including a pair of manually actuated members carried by said housing and adapted to be engaged by the respective hands of a user, one of said manually actuated members being connected to said first control member and the other of said manually actuated members being connected to said second control member, a pair of spaced handles carried by said housing and adapted to be grasped by the respective hands of a user of said tool, and said manually actuated members are respectively carried by said handle members, said manually actuated members including a pair of levers pivotally mounted on said handles, and said levers having handle portions adapted to pivot said levers to positions effecting movement of said control members to their second position when said handles are grasped by the hands of a user of said tool.

5. In a power tool including a housing having a fluid motor therein, said motor having a fluid inlet, a fluid outlet and a power output member adapted to supply power to a work performing member, the improvement of safety control means for controlling the flow of motive fluid supplied to and discharged from said motor aand consequently the operation of said tool, said safety control means including first and second control members respectively associated with the inlet and outlet of said motor, and manually actuated means operable to effect movement of said control members from a first position preventing motive fluid from flowing into the fluid inlet of said motor and out of the fluid outlet of said motor to a second position permitting motive fluid to flow into said motor inlet and out of said motor outlet so that said motor drives said power output member, whereby said safety control means is operable to permit operation of said motor when both of said control members are in said second position and render said motor inoperative to drive said power output member or to rapidly stop the same whenever one or the other or both of said control members is in or moves to said first position, said manually actuated means including a pair of manually actuated members carried by said housing and adapted to be engaged by the respective hands of a user, one of said manually actuated members being connected to said first control member and the other of said manually actuated members being connected to said second control member, a pair of spaced handles carried by said housing and adapted to be grasped by the respective hands of a user of said tool, and said manually acutated members are respectively carried by said handle members, said control members including a pair of valve members.

6. In a power tool including a housing having a fluid motor therein, said motor having a fluid inlet, a fluid outlet and a power output member adapted to supply power to a work performing member, the improvement of safety control means for controlling the flow of motive fluid supplied to and discharged from said motor and consequently the operation of said tool, said safety control means comprising first and second control members respectively associated with the inlet and outlet of said motor, and manually actuated means operable to effect movement of said control members from a first position preventing motive fluid from flowing into the fluid inlet of said motor and out of the fluid outlet of said motor to a second position permitting motive fluid to flow into said motor inlet and out of said motor outlet so that said motor drives said power output member, whereby said safety control means is operable to permit operation of said motor when both of said control members are in said second position and render said motor inoperative to drive said power output member or to rapidly stop the same whenever one or the other or both of said control members is in or moves to said first position, said manually actuated means including a pair of manually actuated members carried by said housing and adapted to be engaged by the respective hands of a user, one of said manually actuated members being connected to said first control member and the other of said manually actuated members being connected to said second control member, a pair of spaced handles carried by said housing and adapted to be grasped by the respective hands of a user of said tool, and said manually actuated members are respectively carried by said handle members, said control members including a pair of valve members, said handles having fluid supply and discharge passages therein respectively communicating with the fluid inlet and outlet ports in said housing, and said valves being movable between positions permitting and preventing fluid flow through said passages.

7. The safety control means of claim 6, further characterized in that said handles have valve seats therein circumscribing said fluid passages and spaced from the inlet and outlet ports of said housing, and said valve members are biased toward said seats by fluid under pressure in said passages.

8. In a power tool including a housing having a fluid motor therein, said motor having a fluid inlet, a fluid outlet and a power output member adapted to supply power to a work performing member, the improvement of safety control means for preventing motive fluid from discharging from said motor to rapidly render the tool inoperative, said safety control means comprising means providing a discharge passage for receiving motive fluid exhausting from the fluid outlet of said motor, a control member operatively associated with said discharge passage, and manually actuated means for effecting movement of said control member from a first position preventing motive fluid from flowing through said discharge passage to a second position permitting motive fluid to flow through said discharge passage, whereby said safety control means is operable to permit operation of said motor when said control member is in said second position and to prevent operation of said motor or to rapidly stop the same when said control member is in or moves to said first position.

9. The safety control means of claim 8, further characterized in that said housing has a fluid outlet port communicating with the fluid outlet of said motor, at least one handle having said discharge passage therein is carried by said housing with said discharge passage in communication with said fluid outlet port, a valve seat is provided in said handle at the end of said discharge passage adjacent to said fluid outlet port, and said control member comprises a valve carried by said handle and positioned between said fluid outlet port and said valve seat, said valve urged toward its seat by fluid under pressure discharging through said fluid outlet port.

10. The safety control means of claim 9, further characterized in that said valve is urged toward its seat by fluid under pressure discharging through said fluid outlet port.

11. The safety control means of claim 9, further characterized in that an arm is pivotally mounted in the end of said handle adjacent to said fluid outlet port, said handle is elongated and said arm extends generally transversely to the axis of said handle and is positioned downstream from said valve seat, and said valve is mounted on an extension of said arm and extending upstream toward said valve seat.

12. The safety control means of claim 11, further characterized in that said arm is pivotally connected at one end to said handle, said extension of said arm is located intermediate the length of said arm, and said manually actuated means effects movement of the free end of said arm.

* * * * *